Feb. 9, 1960 E. J. ZELT 2,924,639
ELECTRICAL JUNCTION BOXES
Filed Nov. 16, 1955 2 Sheets-Sheet 2
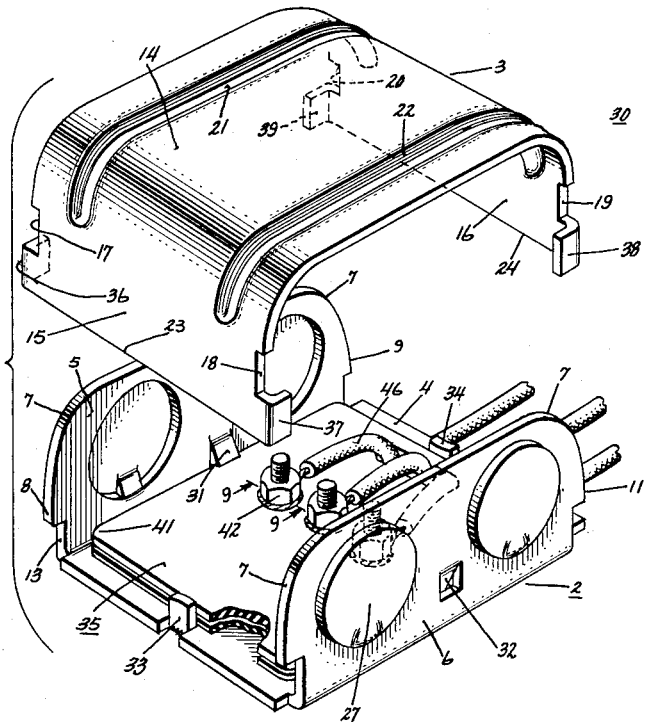
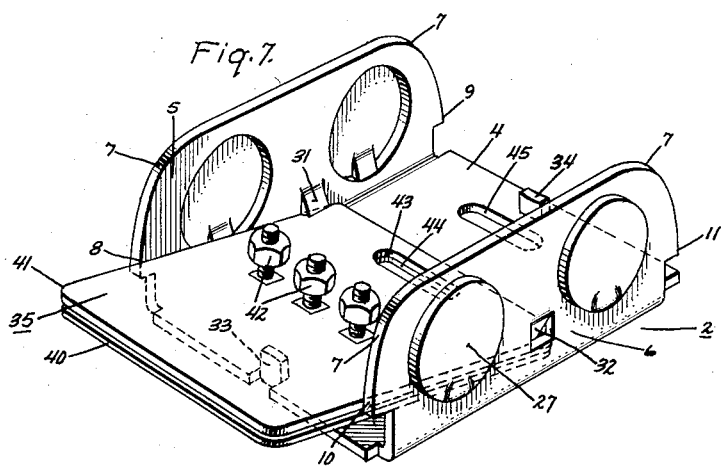
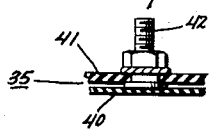
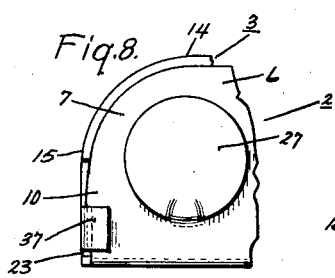
Inventor:
Elmer J. Zelt,
by Robert G. Iriss
His Attorney.

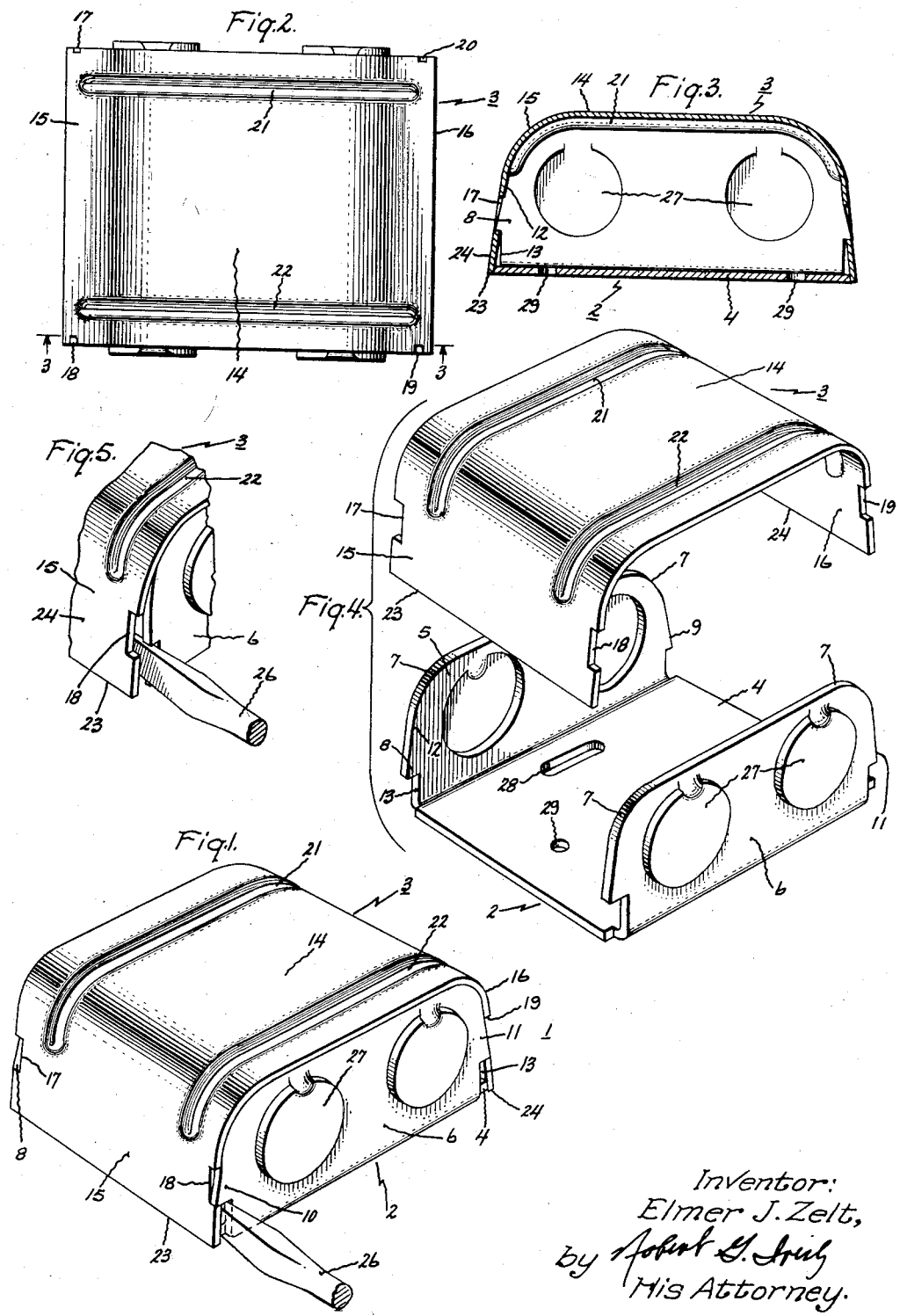

United States Patent Office 2,924,639  
Patented Feb. 9, 1960

2,924,639

ELECTRICAL JUNCTION BOXES

Elmer J. Zelt, Arcadia, Calif., assignor to General Electric Company, a corporation of New York Application November 16, 1955, Serial No. 547,239

4 Claims. (Cl. 174—59)

This invention relates to junction boxes for making electrical connections and more particularly to a junction box having a snap-on cover.

Junction boxes are commonly used in electrical wiring in order to enclose electrical connections. More specifically, numerous electrically energized devices, such as domestic oil burners, include junction boxes for making the electrical connections between the source of power and the internal components; in the case of domestic oil burners, the ignition transformer and pump motor.

In the past, junction boxes, particularly those used with oil burners, have been unduly expensive since they conventionally were formed of at least one drawn part and further since the cover was conventionally secured in place by one or more screws. It is therefore desirable to provide a junction box incorporating a snap-on cover thus eliminating the need for screws. It is also desirable to provide a junction box incorporating a terminal board which is held in assembled relation with the box without the use of screws. It is further desirable that such a junction box be simple, sturdy, inexpensive, readily assembled and disassembled, and in particular that it comprise formed rather than drawn parts. Such a junction box must of course provide a complete enclosure for the electrical connections, be formed of a minimum number of parts, occupy minimum space, and present a pleasing external appearance, particularly when the box is intended for use with devices such as domestic oil burners.

It is therefore a general object of this invention to provide an improved junction box having a snap-on cover.

Another object of this invention is to provide an improved junction box having a snap-on cover and incorporating the desirable features set forth above.

Further objects and advantages of this invention will become apparent by reference to the following description and the accompanying drawing, and the features of novelty which characterize this invention will be pointed out with particularity in the claims annexed to and forming a part of this specification.

This invention in its broader aspects provides a junction box having a rigid U-shaped base member with its bight portion forming the base and its legs forming the end walls of the box. Each leg of the base member has a pair of projections respectively formed on each side edge. A U-shaped cover member is also provided with its bight portion forming the top and its legs forming the side walls of the box, the cover member being formed to fit over the legs of the base member. Each leg of the cover member has a pair of notches respectively formed in its side edges which accommodate the base member projections so that the cover member is removably locked to the base member.

In the drawing, Fig. 1 is a view in perspective showing one embodiment of the improved junction box of this invention;

Fig. 2 is a top view of the junction box of Fig. 1;

Fig. 3 is a cross-sectional view of the junction box of Figs. 1 and 2 taken along the line 3—3 of Fig. 2;

Fig. 4 is an exploded view in perspective showing the base and cover members of the improved junction box of this invention;

Fig. 5 is a fragmentary view in perspective illustrating the manner of removing the cover of the improved junction box of Figs. 1 to 4 inclusive;

Fig. 6 is an exploded view in perspective, partly broken away, showing the preferred embodiment of the improved junction box of this invention and also showing a terminal board;

Fig. 7 is a view in perspective of the base member of the junction box of Fig. 6 showing the manner of assembly of the terminal board;

Fig. 8 is a fragmentary end view of the junction box of Fig. 6 showing the cover and base members in assembled relation; and Fig. 9 is a fragmentary cross-sectional view of the terminal board of Figs. 6 and 7.

Referring now to Figs. 1 through 5 inclusive of the drawing, one embodiment of the improved junction box of this invention, generally identified as 1, comprises a base member 2 and a cover member 3. Base member 2 is formed from suitable sheet metal and has a U-shaped with the bight portion 4 forming the base of the junction box and the leg portions 5 and 6 forming the end walls. Base member 2 is relatively rigid in contrast with cover member 3 which is preferably formed from somewhat thinner sheet metal and which is somewhat flexible.

Each of the leg portions 5 and 6 of base member 2 has its corners rounded, as at 7. Leg portion 5 has downwardly tapered projections 8 and 9 formed on the side edges thereof intermediate rounded corners 7 and base portion 4 while leg portions 6 have similar downwardly tapered projections 10 and 11 formed on its side edges intermediate corners 7 and bight portion 4. It will be observed by reference to Fig. 3 that the edges of each side of each of the leg portions 5 and 6 at their junction with the upward extremities of projections 8, 9, 10 and 11 respectively, as at 12, form acute angles with the bight portion 4 and that the edges of each side of the leg portions 5 and 6 intermediate the projections 8, 9, 10 and 11 respectively and the bight portion 4, as at 13, form a larger angle with the bight 4, for a purpose to be hereinafter described.

Cover member 3 is generally U-shaped in configuration with the bight portion 14 forming the top of junction box 1 and the leg portions 15 and 16 forming the side walls thereof. It will be observed that cover member 3 is formed to fit over the legs 5 and 6 of base member 2. Each of the leg portions 15 and 16 of cover member 3 has a pair of notches formed in the side edges thereof, notches 17 and 18 in leg portion 15 and notch 19 in leg portion 16 being shown in Fig. 4 and notch 20 in leg portion 16 being shown in Fig. 3. Cover member 3 also has a pair of spaced apart inwardly projecting rigs 21 and 22 extending transversely across bight portion 14 and onto leg portions 15 and 16 in order to stiffen cover member 3 and thus to give the requisite flexiblity to provide the snap-on feature.

It will now be seen that cover member 3 may be slid over legs 5 and 6 of base member 2 and that the end edges 23 and 24 of leg portions 15 and 16 respectively of cover member 3 will initially ride over projections 8, 9, 10 and 11 respectively until notches 17, 18, 19 and 20 respectively come into engagement with projections 8, 9, 10 and 11. Projections 8, 9, 10 and 11 will then be seated in notches 17, 18, 19 and 20 respectively thereby locking cover member 3 to base member 2. It will be observed that ribs 21 and 22 stiffen cover member 3 and contribute the requisite spring tension on leg portions 15 and 16 to provide snap-on feature.

It will now be observed that when cover member 3 has been snapped onto base member 2, lower portion 25 of leg portions 15 and 16 respectively of cover member 3 are spaced from side edges 13 of leg portions 5 and 6 of base member 2 by virtue of the fact that side edges 13 form a greater angle with bight portion 4 of base member 2 than the angle formed by side edges 12 and also since end edges 23 respectively engage the end edges of bight portion 4 of base member 2, as best seen in Fig. 3. These spaces permit the insertion of a suitable tool, such as screw driver 26 as shown in Figs. 1 and 5 with which the associated leg portion of the cover member, as for example leg portion 15 as shown in Fig. 5, may be biased outwardly so that notches 17 and 18 are disengaged from projections 8 and 10 respectively thus permitting ready removal of cover member 3 from the base member 2.

In order to provide for admission of electrical leads to the interior of junction box 1, suitable knock-outs 27 may be formed in leg portions 5 and 6 of base member 2. In order to admit leads from, for example an oil burner ignition transformer, a suitable elongated opening 28 may be formed in the bight portion 4 of base member 2 and in addition, suitable mounting holes 29 may be also formed in bight portion 4 of base member 2 for accommodating screws for mounting the base member 2 on an external surface.

Referring now to Figs. 6 through 9 inclusive of the drawings, in which like elements are indicated by like reference numerals, there is shown the preferred embodiment of the improved junction box of this invention, generally identified as 30. Junction box 30 is generally similar to the embodiment of Figs. 1 through 5 inclusive, and again comprises base member 2 and cover member 3. Base member 2, which is again preferably formed from suitable sheet metal has the same U-shape with the bight portion 4 forming the base and the legs 5 and 6 forming the end walls. The corners of the leg portions 5 and 6 of the base member 2 are rounded as at 7 and respectively have downwardly tapered projections 8, 9, 10 and 11 formed on their side edges intermediate corners 7 and bight portion 4. Legs 5 and 6 of base member 2 also respectively have inwardly extending tabs 31 and 32 formed therefrom and respectively spaced from bight portion 4. Bight portion 4 also has upwardly extending tabs 33 and 34 formed on its side edges, the tabs 31, 32, 33 and 34 serving to hold terminal board 35 in assembled relation, as will hereinafter be more fully described.

Cover member 3 is again generally U-shaped in configuration and formed of suitable sheet metal with its bight portion 14 forming the top of the junction box 30 and its leg portions 15 and 16 forming the side walls. Leg portions 15 and 16 of cover member 3 respectively have notches 17, 18, 19 and 20 formed in their side edges spaced from end edges 23 and 24. Cover member 3 also respectively has tabs 36, 37, 38 and 39 formed intermediate notches 17, 18, 19 and 20 and end edges 23 and 24. Tabs 36, 37, 38 and 39 respectively engage the outer surfaces of legs 5 and 6 of base member 2 when the cover member 3 is assembled on the base member 2, as best seen in Fig. 8. It will be seen that tabs 36, 37, 38 and 39 properly locate cover member 3 with respect to legs 5 and 6 of base member 2 as it is slid thereover and it will be of course seen that downwardly tapered projections 8, 9, 10 and 11 on leg members 5 and 6 of base member 2 again respectively engage notches 17, 18, 19 and 20 of cover member 3 in the manner described in connection with Figs. 1 to 5 inclusive. In addition to properly locating cover member 3 with respect to base member 2 during the assembly operation, tabs 36, 37, 38 and 39 also provide a means for removing cover member 3 from base member 2 without requiring the use of a separate tool as in the case of the embodiment of Figs. 1 to 5 inclusive; one pair of these tabs, for example, tabs 36 and 37 can be readily grasped with the fingers thus permitting leg portion 15 to be bent or distorted sufficiently to permit notches 17 and 18 to be disengaged from projections 8 and 10 thus permitting removal of cover member 3.

It will be observed in the embodiment of Figs. 6 through 9 inclusive that projections 8, 9, 10 and 11 of base member 2 are more smoothly joined to corners 7 since with the provision of tabs 36, 37, 38 and 39 it is not necessary to provide an opening to accommodate a tool as the case of the embodiment of Figs. 1 through 5 inclusive. This somewhat more rounded configuration of projections 8, 9, 10 and 11 is best seen in Fig 8. It will also be observed that legs 5 and 6 of base member 2 are also provided with knock-outs 27 for admitting electrical leads to the interior of the box and that cover member 3 is also provided with transverse stiffening ribs 21 and 22.

It will also be seen by reference to Fig. 8 that end edges 23 and 24 of cover member 3 engage the upper surface of bight portion 4 of base member 2 rather than the end edges thereof as in the case of Fig. 3.

Referring now specifically to Figs. 6, 7 and 9, terminal board 35 comprises two separate sheets 40 and 41 of suitable sheet insulating material with terminal studs 42 being secured in the upper sheet 41 and thereby insulated from bight portion 4 of base member 2. It will be observed that terminal board 35 is held in engagement with bight portion 4 of base member 2 by tabs 31 and 32 on legs 5 and 6 of base member 2 and is also held in position by tabs 33 and 34 on bight portion 4. Terminal board 35 can be slid readily into position as shown in Fig. 7. Openings 43 and 44 are formed in portions 40 and 41 of terminal board 35, these openings communicating with opening 45 in bight portion 4 of base member 2. Openings 43, 44 and 45 permit the entry of external leads 46 to the interior of the junction box for connection to terminal studs 42. It will be readily observed that so long as there are no leads extending through openings 43, 44 and 45, terminal board assembly 35 may be slid into and out of assembled position on bight portion 4, however, that when leads 46 pass through openings 43, 44 and 45, terminal board assembly 35 is held in position and can no longer be removed. It is thus seen that terminal board assembly 35 is held in assembled relation without the use of separate screws. It will of course, be readily understood that the terminal board assembly 35 together with tabs 31, 32, 33 and 34 and openings 43, 44 and 45 can be utilized with the embodiment of Figs. 1 through 5 inclusive and that it is merely shown in connection with the embodiment of Figs. 6 through 9 inclusive for illustrative purposes.

It is thus seen that the embodiment of Figs. 6 through 9 inclusive provides a junction box with a snap on cover which can be accurately and correctly assembled and removed without the use of separate tools.

It will now be readily apparent that this invention provides an extremely simple junction box incorporating a snap-on cover with all components being formed with simple dies rather than being drawn, a positive locking of the cover member on the base member being provided, and the box presenting a pleasing external appearance. An actual junction box constructed in accordance with Figs. 1 through 5 of this invention was 3⅛ inches long, 2½ inches wide and 1⁵⁄₁₆ inches high with the base member 2 being formed of sheet steel of .0598 inch thickness and cover member 3 being formed of sheet steel of .0359 inch thickness.

While I have shown and described particular embodiments of this invention, further modifications and improvements would occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. A junction box comprising a rigid U-shaped base member with its bight portion forming the base and its leg portions respectively forming the end walls of said box, each side edge of each leg portion of said base member having a downwardly tapered projection formed thereon, and a flexible U-shaped cover member with its bight portion forming the top and its leg portions respectively forming the side walls of said box, said cover member being formed to fit over said leg portions of said base member, each side edge of each leg portion of said cover member having a notch formed therein, said base member projections respectively being seated in said cover member notches thereby removably locking said cover member on said base member.

2. A junction box comprising a rigid U-shaped base member with its bight portion forming the base and its leg portions respectively forming the end walls of said box, each leg portion of said base member having its corners respectively rounded, each side edge of each leg portion of said base member having a downwardly tapered projection formed thereon intermediate said rounded corners and said bight portion, and a flexible U-shaped cover member with its bight portion forming the top and its leg portions respectively forming the side walls of said box, said cover member being formed to fit over said leg portions of said base member, each side edge of each leg portion of said cover member having a notch formed therein, said base member projections respectively being seated in said cover member notches thereby removably locking said cover member on said base member, the edge of each side of each of said leg portions at its junction with the upper extremity of the respective projection forming an acute angle with said base member bight portion, the edge of each side of said leg portions intermediate the respective projection and said base member bight portion forming an angle with said base member bight portion larger than said first named angle whereby the extremities of said cover member leg portion beyond said notches are respectively spaced from said base member leg portions thereby permitting insertion of a tool to remove said cover member from said base member, said cover member having a pair of spaced apart inwardly depressed transverse ribs extending across said bight portion and respectively onto said leg portions thereof thereby stiffening said cover member and providing spring tension so that said cover member may be snapped into locking engagement with said base member, said base member bight portion and at least one of said base member leg portions having means to admit electrical leads to the interior of said box formed therein.

3. A junction box comprising a rigid U-shaped base member with its bight portion forming the base and its leg portions respectively forming the end walls of said box, each leg portion of said base member having its corners respectively rounded, each side edge of each leg portion of said base member having a downwardly tapered projection formed thereon intermediate said rounded corners and said bight portion, and a flexible U-shaped cover member with its bight portion forming the top and its leg portions respectively forming the side walls of said box, said cover member being formed to fit over said leg portions of said base member, each side edge of each leg portion of said cover member having a notch formed therein spaced from the end edge thereof, said base member projections respectively being seated in said cover member notches thereby removably locking said cover member on said base member, each side edge of each leg portion of said cover member having a tab formed thereon intermediate the respective notch and said end edge, said tabs respectively engaging said base member leg portions thereby locating said cover member on said base member.

4. A junction box comprising a rigid U-shaped base member with its bight portion forming the base and its leg portions respectively forming the end walls of said box, each side edge of each leg portion of said base member having a projection formed thereon, a U-shaped cover member with its bight portion forming the top and its leg portions respectively forming the side walls of said box, said cover member being formed to fit over said leg portions of said base member, each side edge of each leg portion of said cover member having a notch formed therein, said base member projections respectively being seated in said cover member notches thereby removably locking said cover member on said base member, each of said base member side legs having an inwardly projecting tab formed thereon and spaced from said bight portion thereof, said base member bight portion having a pair of upwardly extending tabs respectively formed on its side edges, and a terminal board positioned on said base member bight portion between said upwardly extending tabs, said terminal board having a lower portion formed of sheet insulating material engaging said base member bight portion and an upper portion formed of sheet insulating material engaging said lower portion and having at least one terminal stud secured thereto, said downwardly extending tabs engaging said terminal board upper portion thereby securing said terminal board to said base member bight portion, said base member bight portion and said terminal board having communicating openings formed therein for admitting electrical leads to the interior of said junction box.

References Cited in the file of this patent

UNITED STATES PATENTS

| 1,217,398 | Bonnell | Feb. 27, 1917 |
| 1,481,415 | Casper | Jan. 22, 1924 |
| 1,718,878 | Raquette | June 25, 1929 |
| 1,898,282 | Almcrantz | Feb. 21, 1933 |
| 1,909,136 | Thomas | May 16, 1933 |
| 2,046,810 | Cannon | July 7, 1936 |
| 2,180,575 | Badger | Nov. 21, 1939 |
| 2,420,184 | Mekelburg | May 6, 1947 |
| 2,457,023 | Zelt | Dec. 21, 1948 |

FOREIGN PATENTS

| 889,620 | Germany | July 8, 1949 |